United States Patent [19]

Horn

[11] 4,433,579
[45] Feb. 28, 1984

[54] PRESSURE INDICATOR

[75] Inventor: Walter Horn, Idar-Oberstein, Fed. Rep. of Germany

[73] Assignee: Fissler Gesellschaft mit beschrankter Haftung, Idar-Oberstein, Fed. Rep. of Germany

[21] Appl. No.: 352,037

[22] Filed: Feb. 24, 1982

[30] Foreign Application Priority Data

Mar. 3, 1981 [DE] Fed. Rep. of Germany ....... 3108017

[51] Int. Cl.³ .............................................. G01L 7/08
[52] U.S. Cl. ...................................... 73/715; 220/316
[58] Field of Search .................... 73/715, 146.8, 744, 73/716; 116/271; 220/DIG. 16, 316, 318

[56] References Cited

U.S. PATENT DOCUMENTS 1,106,341  8/1914  Bristol .............................. 116/271
4,330,069  5/1982  Bauer ............................... 220/316

Primary Examiner—Donald O. Woodiel
Attorney, Agent, or Firm—Goodman & Teitelbaum

[57] ABSTRACT

The invention relates to a pressure indicator on a steam pressure cooker or similar container. This pressure indicating device is simple in construction and assembly, having a constant pressure display dependable in its functioning with little subject to fouling, and includes a membrane. Under action of the internal pressure of the container, the membrane brings about relative movement in an axial direction between a twist-giver nut and a twist spindle from which there follows a rotation of one of these members, and thereby a proportional pressure display by a pointer or marking connected to the one rotating member.

12 Claims, 4 Drawing Figures

PRESSURE INDICATOR

The invention relates to a pressure indicator on a pressure cooker or similar container.

Conventional mechanical pressure indicators, for example, for steam pressure cookers, autoclaves and the like containers are constructed either according to the principle of the Bourdon tube manometer, or the present spring-loaded piston acted upon by the internal pressure of the container, which piston can be lifted more or less far out of its receiving casing and through its position, for example by corresponding markings, shows the internal pressure.

Pressure indicators with a Bourdon tube manometer are relatively expensive, since there are required, for example, the soldered Bourdon tube, complicated lever mechanisms and a series of parts, mechanically processed, are machined with shaving. A Bourdon manometer arrangement, for example in use in a steam pressure cooker for household purposes, is extremely subject to fouling, since the pressure medium can enter the Bourdon manometer, to which medium there can also belong the foods treated in the container themselves. Pressure indicating devices with the pistons constructed as boil-indicating pins are likewise easily subject to fouling, they tend to slide back and indicate the boiling pressure of the container only, thus being inaccurate. In valves of steam pressure cookers there is frequently also provided a cooking pressure stage adjustment which, on setting of the bias tension of the valve spring, give the user the impression that the cooking pressure is altered. There, only the contact pressure of the pressure regulating valve is changed. The cooking pressure itself must nevertheless be regulated by hand, i.e., operation of the heating stage of the cooking plate, in such a way that, for example, the first groove of the cooking pin retains an unvaried elevational position. If one depends on the cooking stage setting, then under some circumstances the valve blows off steam and the small amount of fluid in the apparatus evaporates. The consequence of this is that foods catch fire or burn.

It is more advantageous if the cooking pressure is shown constantly and reproducibly for use.

The problem of the present invention is to provide a pressure indicator of the type mentioned at the outset, which is easily assemblable from a few parts and shows the cooking pressure constantly and reproducibly. There, in particular, the penetration of the pressure medium inclusive of foods into the pressure indicating device is also to be prevented.

This problem is solved according to the invention by a membrane arranged in the zone of a container opening, closing the container opening when the membrane is stretched on its edge, the membrane being of elastic material, and by a combination of a twist-giver nut arranged secure against turning and a twist spindle engaging into the recess of the twist-giver nut, fitted in its cross section to the recess, and possibly carrying a pointer, with either the twist-giver nut or the twist spindle abutting on the outer surface of the membrane, and the twist-giver nut and twist spindle being axially shiftable with respect to one another with the turning of the twist spindle.

With the invention it is achieved, first of all, that the pressure indicator is hermetically sealed off against the interior of the container. The membrane side facing the interior of the container can be cleaned simply. The solution described above speaks of a twist-giver nut arranged secure against turning and of a turnably borne twist spindle. What is essential in these two combination parts is merely that they turn relatively to one another on axial displacement, and, namely, by reason of the cooperating twist-giver surfaces. In the case described above, the part of the combination that presents an inner twist-giver surface is designated as the fixed twist-giver nut and the part that presents an outer twist-giver surface, for example in the manner of the spindle of a drill, is designated as the twist spindle. Obviously, the the relations can also be reversed in such a way that the nut is equipped with an outer twist-giver surface (for example a square end), while the twist spindle has an inside-lying twist-giver surface, such as, for example, a square tube twisted about its axis. Obviously, the relations can also be varied in such a manner that the part designated as the twist-giver nut is turnably borne in the pressure indicating system and the twist spindle is arranged securing against turning. What is essential in this context is only that the pointer showing the pressure, or a corresponding marking, is connected with the turnable part. What is essential in the scope of the idea of the invention, therefore, is the combination of the two parts shiftable axially with respect to one another on turning, in which the axial movement comes about through the feature that the one part, or the other, abuts on the membrane in the zone of the container opening, in the zone of which the pressure indicator is provided, which membrane is arranged in such a way that it can be deformed under the internal pressure of the container and thereby can generate the required axial movement.

An especially simple embodiment of the invention is arrived at if the recess of the twist-giver nut is formed rectangular and the twist spindle is formed of a twisted rectangular band rod.

For the fixing secure against turning of the twist nut when abutting on the membrane, the twist nut can be, for example, buttonable into the membrane, and thereby can also be easily detachable again.

A twist nut usable for the invention is obtained in a simple manner of manufacturing technology, if this is formed of a strip of flat material pressed into a U-profile, which in its cross bands presents the recess and is buttonable with its legs into the membrane. For this purpose, for example, the legs of the strip can be bent outward at their ends.

Without impairment of the sealing function of the membrane, a buttonability of the twist-giver nut into the membrane is ensured if the membrane has on its outer surface buttoning bulges for the twist-giver nut.

Advantageously the membrane is buttonable with a border bulge into the container opening, for example the cover opening. The container opening is in this form of execution, therefore, completely spanned by the membrane. The other parts of the pressure indicating device are located exclusively outside the container interior bounded by the membrane and the container wall. If the pressure indicator of the invention, however, is provided in a cooking valve known per se (cf. for example, German unexamined patent specification OS 28 12 964), instead of the boiling-indicating pin provided there, then the membrane of the invention can be arranged bridging the boiling pin receiving bore of the valve body, and if need be, can be buttoned in.

Although the membrane can be formed of such material and in such shaping that on pressure decrease it moves back into its starting position, the membrane is expediently supported with its outer surface on a pressure spring. The membrane, therefore, in this case merely needs to be flexible, while the restoring force is generated by the pressure spring. In this manner it is possible through selection of the pressure spring properties, independently of membrane material and the shaping of the membrane, to determine the desired pressure display range in adaptation to a scale provided for this in a simple manner.

The twist spindle itself is advantageously turnably borne in a casing and abuts with a cam on the inner surface of the casing, preferably in a removable window zone of the casing, against axial displacement. The casing is in this case attached to the container wall, gripping over the container opening. This casing can also present the counter-surface for the pressure spring, on which the membrane abuts.

The twist spindle is there preferably insertable into a closable recess of the casing, receiving also the pointer which is possibly provided, with the leaning of one spindle shoulder against a bearing shoulder of the casing. This measure, too, serves for the simple assembling, in which the rotary bearing of the twist spindle is achieved simply by the means that this is applied on the one hand with the spindle shoulder against the bearing shoulder, and on the other hand the spindle abuts with its cam on the inner surface of the casing. There the twist spindle can extend appropriately through an inner opening of the casing on into a recess of the casing facing the interior of the pot, which latter recess also receives the pressure spring on which the membrane can abut and which provides the required free space for the axial movement of the twist-giver nut and of the membrane.

The casing is advantageously constructed as a part or section of the container grip, for example, the cover handle. In this manner the pressure indicator of the invention can be provided without substantial alteration of the outer appearance of steam pressure cookers and similar containers already on hand.

Further aims, advantages, features and possibilities of use of the present invention are yielded from the following description of examples of execution with the aid of the enclosed drawing. There, all the features described and/or pictorially represented by themselves or in any reasonable combination form the object of the present invention, as illustrated by way of example in the accompanying drawings of a preferred embodiment in which.

Figure 1:
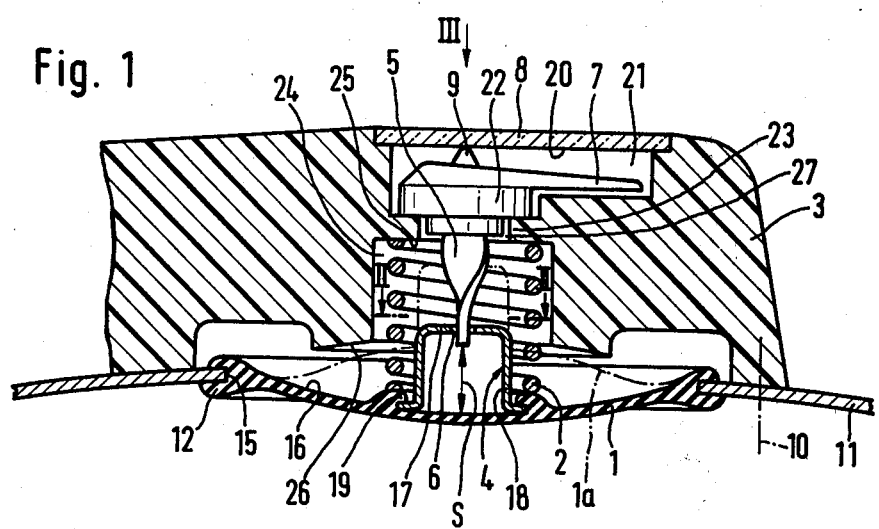
FIG. 1 shows a vertical section through a pressure indicator presenting the invention.
Figure 2:
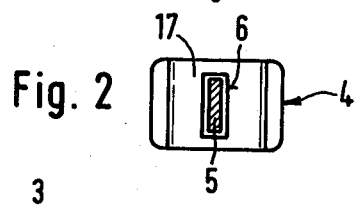
FIG. 2 is a horizontal section along line II—II of FIG. 1 of the twist-giver nut.
Figure 3:
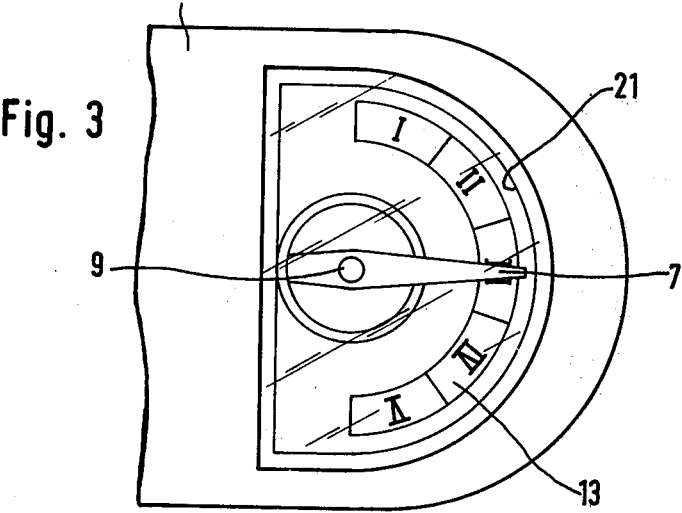
FIG. 3 is a plan view according to arrow III of FIG. 1 for the illustration of the manometer scale.

According to FIG. 1, into an opening 15 of a container 11, in the cover zone thereof, a membrane 1 is stretched and and buttoned with the aid of an outer edge bulge 12, the membrane 1 being of elastic material, such as for example rubber or plastic. Any other form of the sealing application of the membrane 1, however, is also possible. In particular, it is not necessary that the membrane 1 bridge directly across the entire container opening 15, if, for example, in the container opening 15 there is in any case already arranged a casing of a cooking value known per se. The membrane 1 abuts, on its outer surface 16, a pressure spring 2, the spring 2 being received in a recess 24 of a casing 3 facing the container and abutting on an inner shoulder 25 of this recess 24. The casing 3, which in the case represented is formed as a section of the cover handle and is fixed by a fastening 10 to the cover part of the container 11, grips over the container opening 15 and has in the zone surrounding the recess 24, facing the interior of the pot, an inclined back engagement surface 26, which, on the one hand, permits the deformation of the membrane 1, under the action of the interior pressure of the container, into the position represented in broken lines and offers a support for the membrane 1 in this bowed out position. On the outer surface 16, the membrane 1 has button-in bulges 19 for the reception of the sections bent outward of legs 18 of a U-profile strip, which forms a twist-giver nut 4 which defines the driving member. For this purpose, there is provided in the crossbar 17 of the twist-giver nut 4, thus arranged secure against turning, as is evident especially from FIG. 2, a rectangular recess 6. The recess 24 continues upward through a reduced opening 27 up into a recess 21 for the reception of a twist spindle 5, which defines the rotating member, with a pointer 7. The twist spindle 5 consists in its lower zone of a twisted rectangular band bar with, as is to be seen from FIG. 2, a cross section fitting the recess 6. The recess 21 forms on the casing 3 a bearing shoulder 23 around the reduced opening 27 on which the spindle 5 leans with a spindle shoulder 22. Upward, the twist spindle 5 is provided with a cam 9 which abuts on the inner surface 20 of a window zone 8 of the casing 3. The window zone 8 is insertable, as a special cover glass, into a depression of the casing 3. The recess 21 widens in the region of the pointer 7, as is shown especially in the plan view of FIG. 3, into a flat trough, in which there can be mounted a manometer scale 13.

Figure 4:
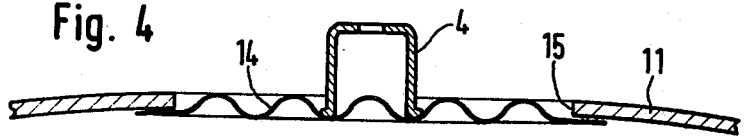
FIG. 4 is another form of execution of the membrane usable in the invention.

Now when a container internal pressure acts against the spring-loaded membrane 1, then the membrane is raised, and with it the twist-giver nut 4. The twist spindle 5 thereby running in the recess 6, turns in the process of the axial movement of the twist-giver nut 4, and with it the pointer 7 proportionally to the internal pressure. The total path S of the membrane 1 can be made all the shorter, depending upon the length of the twist spindle 5. Furthermore, the steepness of the twist thread is determinative for the translation of the axial membrane movement into the rotary movement of the twist spindle 5 and thereby the swinging movement of the pointer 7. A few millimeters of lift is suffice to bring about a pointer rotation of at least 90°. While FIG. 1 illustrates a membrane 1 of rubber-elastic material, FIG. 4 shows an alternative execution with a corrugated membrane 14 with its flat outer edge cemented to the underside of the container cover 11 in the zone of the container opening 15. Also the strip acting as twist-giver nut 4 is connected in a suitable manner with the outer surface of the corrugated membrane 14. A special pressure spring can be dispensed with here if the corrugated membrane 14 develops an adequate resetting force.

List of Reference Numbers

1—Membrane
2—Pressure spring
3—Casing (cover handle)
4—Twist-giver nut (strip)
5—Twist spindle
6—Recess
7—Pointer 8—Window zone (cover glass)
9—Cam
10—Fastening
11'Container (-cover)
12—Edge bulge
13—Manometer scale
14—Corrugated membrane
15—Container opening
16—Outer surface
17—Crossbar
18—Leg
19—Button-in bulges
20—Inner surface
21—Recess
22—Spindle shoulder
23—Bearing shoulder
24—Recess
25—Shoulder
26—Resting surface
27—Reduced opening

What is claimed is:

1. A pressure indicator on a steam pressure cooker or similar container having a container opening, said pressure indicator comprising:
   a twist-giver nut provided with a recess;
   a twist spindle extending through said nut recess;
   said twist spindle having a cross section corresponding to said nut recess;
   one of said twist-giver nut and twist spindle defining a driving member, and the other one of said twist-giver nut and twist spindle defining a rotating member, said rotating member being rotated by axial movement of said driving member;
   a membrane of elastic material being secured adjacent to the container opening with said membrane being stretched to close the container opening;
   a casing disposed on the container above the container opening, said casing being provided with an open space for receiving said rotating member, said open space facing downwardly towards an outer surface of said membrane, and said open space extending upwardly to a removable window zone of said casing;
   first means for securing said driving member against rotation on said outer surface of said membrane so that said driving member moves together with said membrane to provide said axial movement;
   said rotating member being provided with a pointer and a cam at one end thereof spaced from said driving member;
   second means for rotatively mounting said rotating member in said open space of said casing with said pointer disposed adjacent to said window zone; and said cam being disposed against an inner surface of said window zone to prevent axial movement of said rotating member;
   whereby when internal pressure within the container acts against said membrane, said membrane is raised together with said driving member to rotate said rotating member together with said pointer proportionally to the internal pressure.

2. A pressure indicator according to claim 1, wherein said driving member is said twist-giver nut, and said rotating member in said twist spindle.

3. A pressure indicator according to claims 1 or 2, wherein said nut recess is rectangular, and said twist spindle includes a twisted rectangular band bar extending through said nut recess.

4. A pressure indicator according to claim 2, wherein said first means includes buttoning said twist-giver nut into said membrane.

5. A pressure indicator according to claim 4, wherein said twist-giver nut is a strip of flat material having a pair of legs connected at their ends by a crossbar to define a U-shaped nut, said nut recess being provided in said crossbar with said legs being buttoned into said membrane.

6. A pressure indicator according to claim 4 or 5, wherein said membrane is provided with button-in bulges on said outer surface for buttoning said twist-giver nut.

7. A pressure indicator according to claims 1 or 2, wherein said twist-giver nut is a strip of flat material having a pair of legs connected at their ends by a crossbar to define a U-shaped nut, said nut recess being provided in said crossbar.

8. A pressure indicator according to claim 7, wherein said nut recess is rectangular, and said twist spindle includes a twisted rectangular band bar extending through said nut recess.

9. A pressure indicator according to claims 1, 2 or 4, wherein said membrane includes an edge bulge, said edge bulge being buttoned into the container opening.

10. A pressure indicator according to claims 1, 2 or 4, wherein a pressure spring is disposed in said open space of said casing, said pressure spring abutting against said outer surface of said membrane.

11. A pressure indicator according to claim 1, wherein said second means includes a bearing shoulder provided in said open space of said casing below said removable window zone, and a spindle shoulder provided on said rotating member below said pointer, said spindle shoulder resting on said bearing shoulder for rotation of said rotating member.

12. A pressure indicator according to claim 1, wherein said casing is constructed as a part of a handle of the container.

* * * * *